10

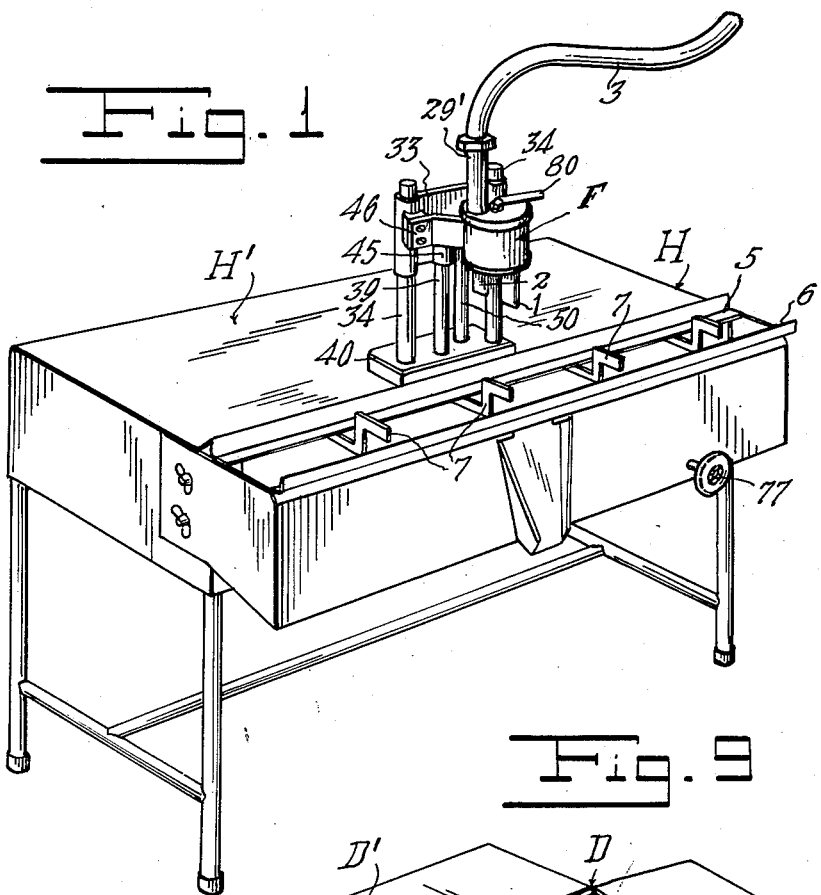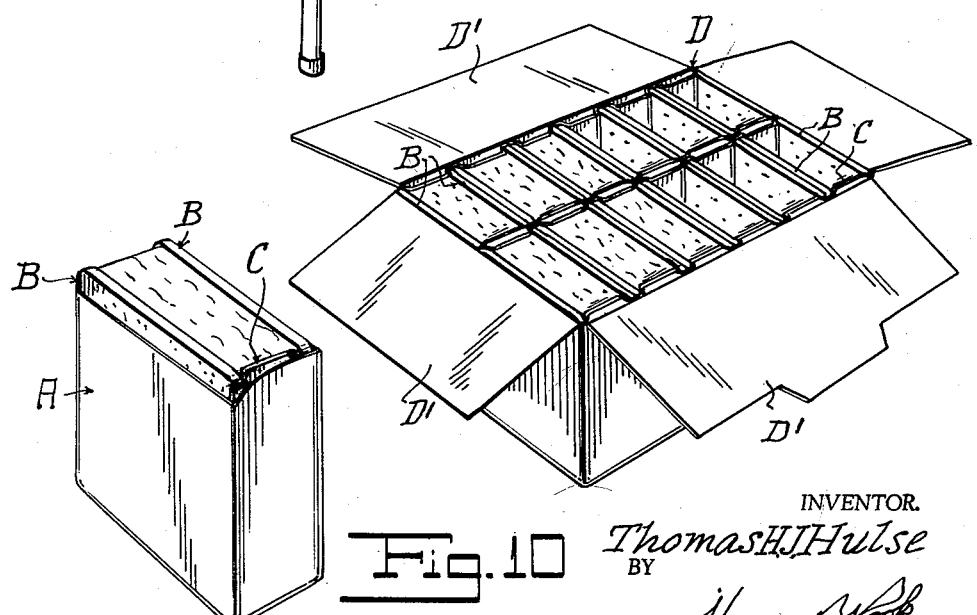

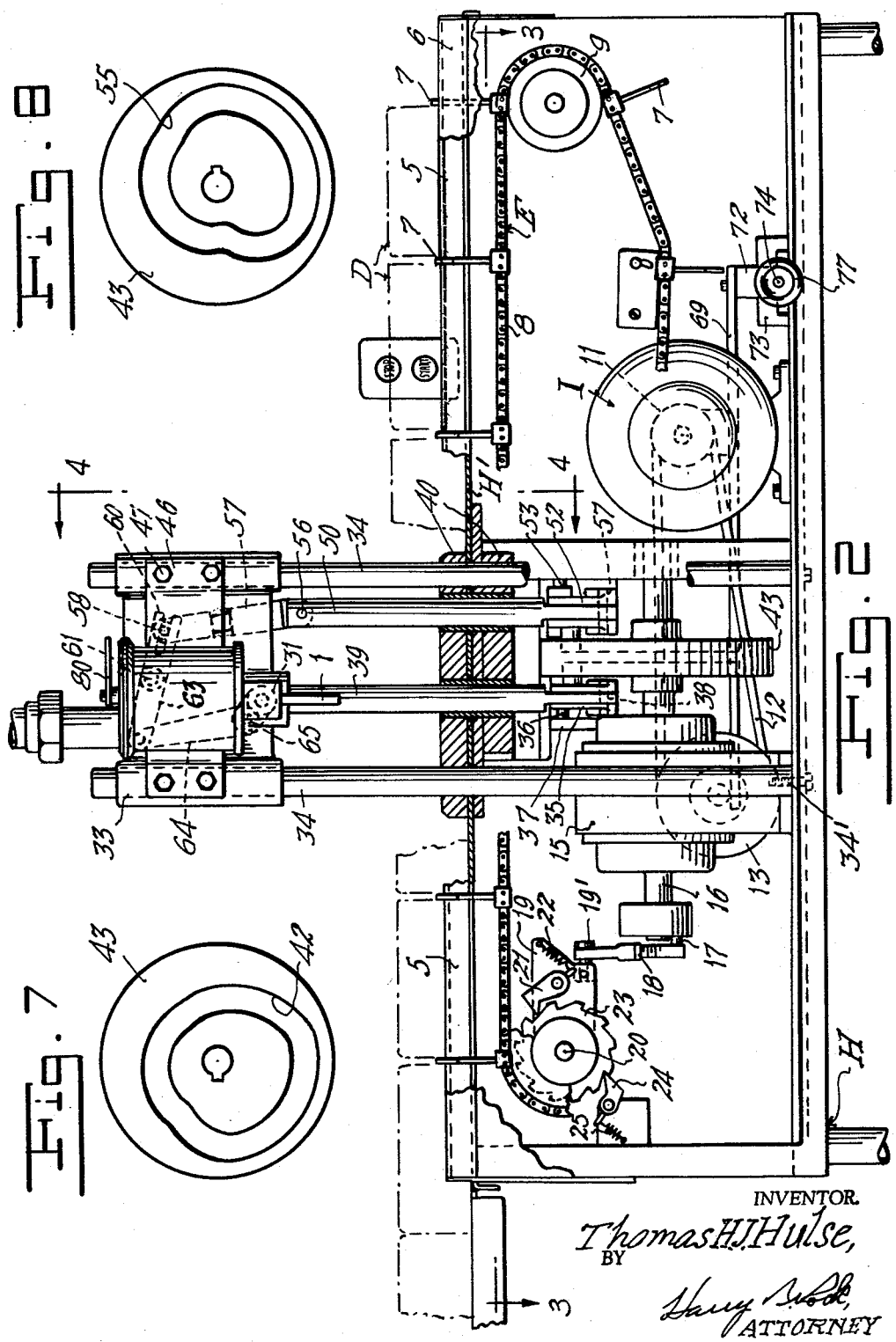

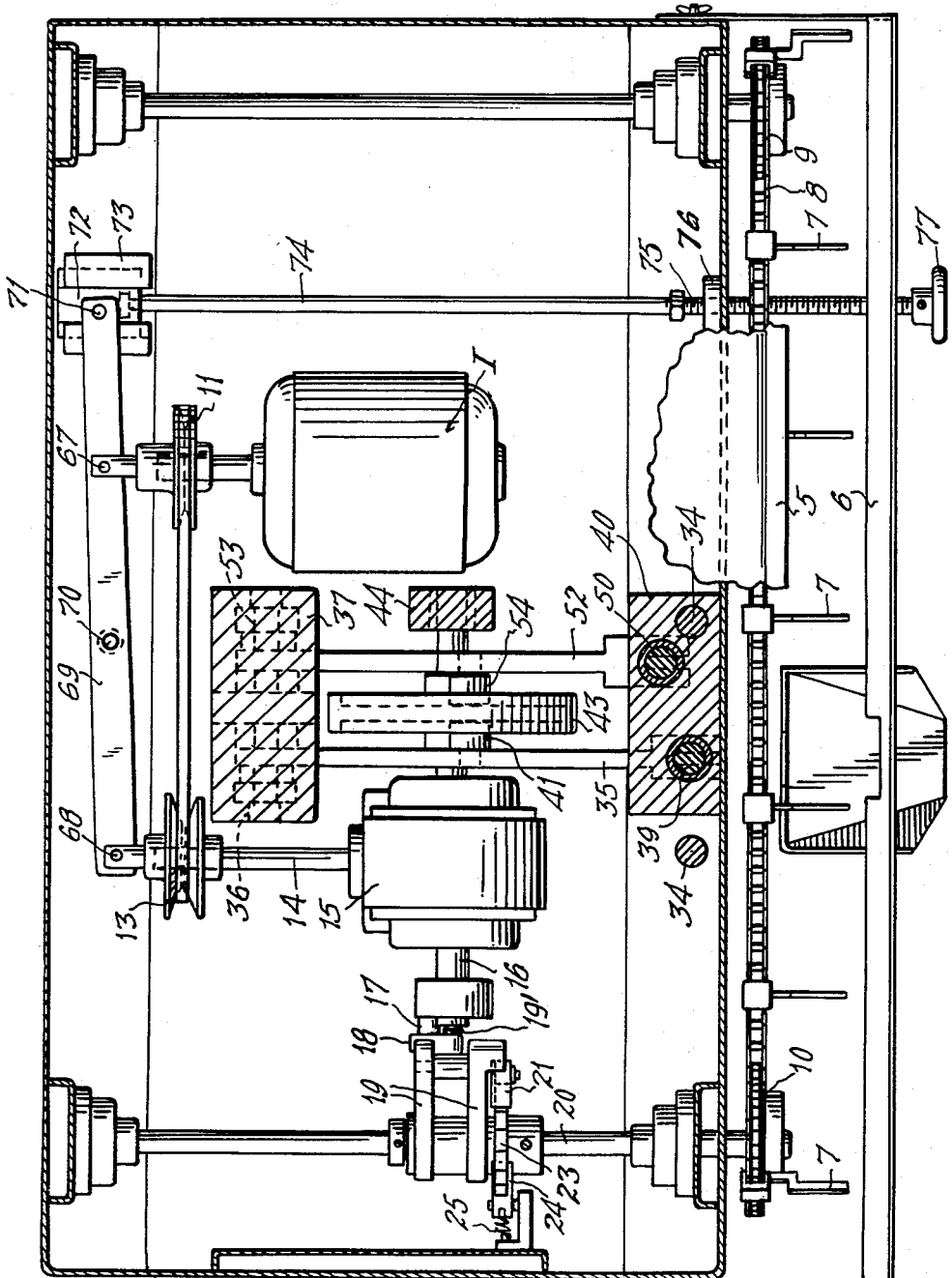

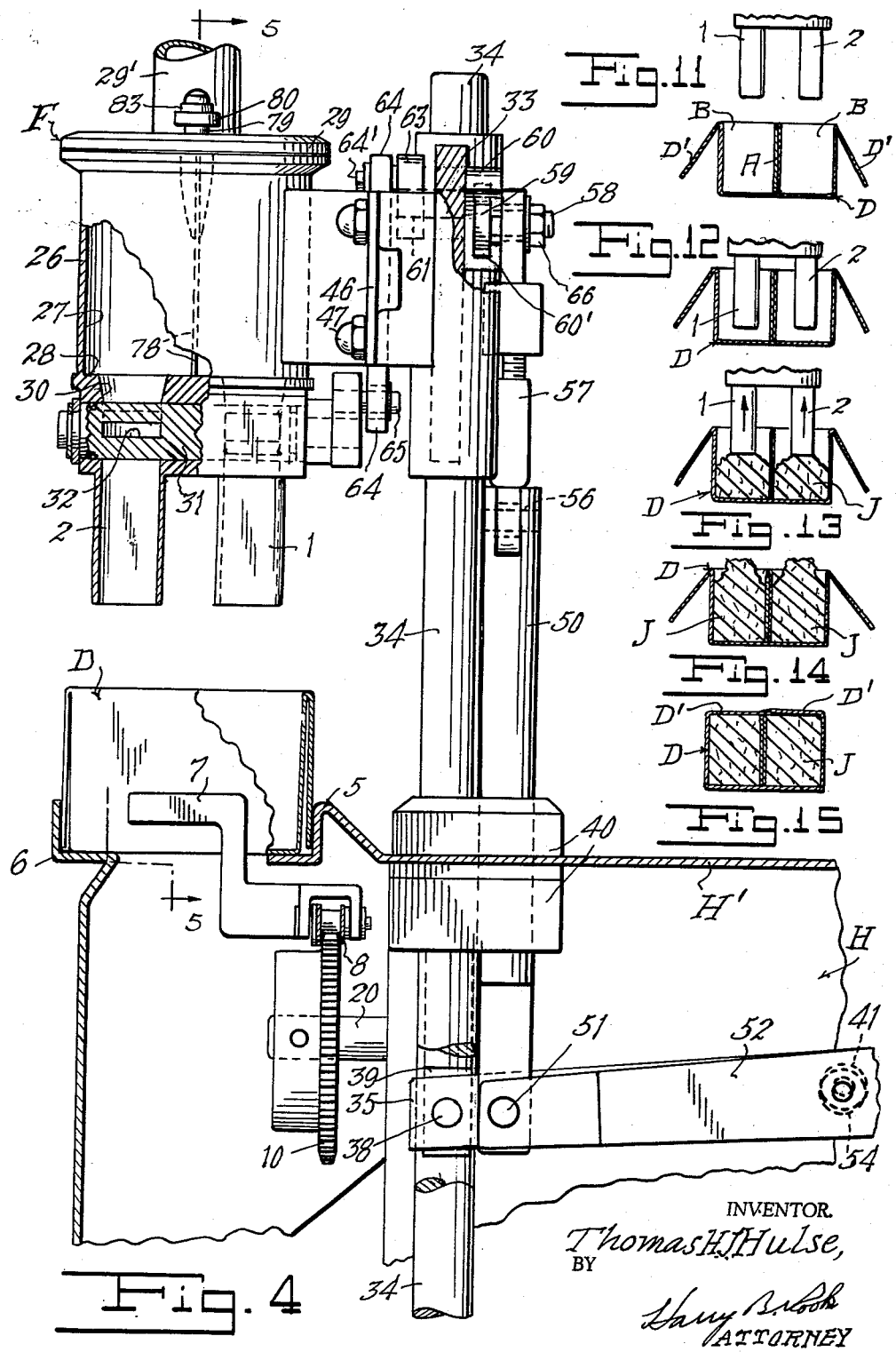

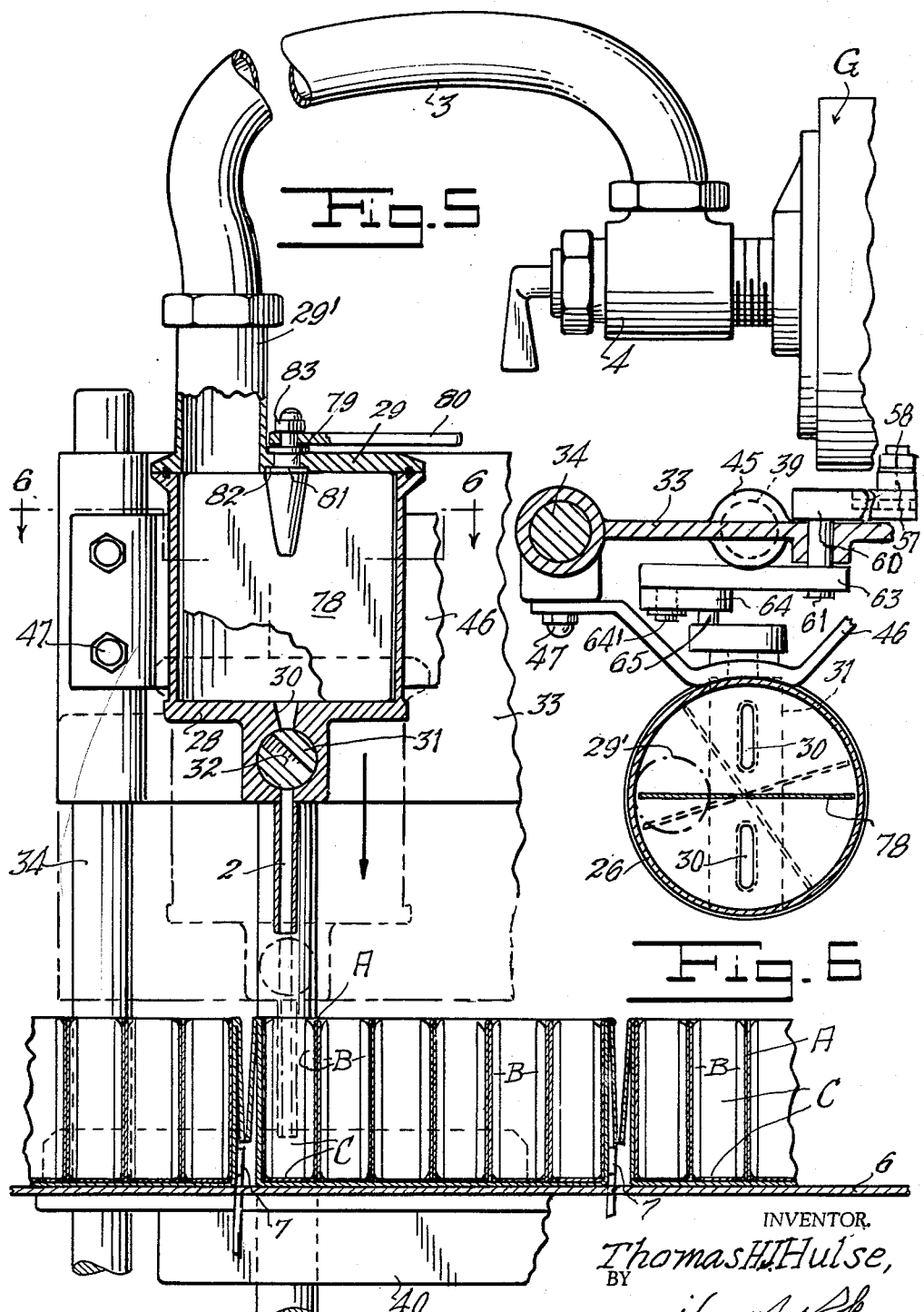

United States Patent Office 3,166,025
Patented Jan. 19, 1965

3,166,025
AUTOMATIC DEPOSITING MACHINE FOR ICE CREAM OR THE LIKE
Thomas H. J. Hulse, Scotch Plains, N.J., assignor, by mesne assignments, to The Quaker Oats Company, a corporation of New Jersey
Filed Dec. 5, 1961, Ser. No. 157,150
4 Claims. (Cl. 107—8)

This invention relates in general to a machine for automatically depositing intermittently, predetermined quantities of ice cream or the like, and more particularly, the invention contemplates a machine for filling in succession individual packages of different forms and shapes directly from a continuous source of supply such as an ice cream making machine. A specific embodiment of the invention is contemplated for depositing ice cream in individual packages or bags arranged in a row and each of which contains two wafers held apart by a formed insert which creates a cavity to receive the ice cream, the packages being moved one by one to and from a position beneath a filling nozzle through which ice cream is ejected under pressure from an ice cream making machine or freezer. Hereinafter the term "ice cream" is used to include any fluent substance of the general nature of ice cream.

One object of the invention is to provide a machine of this character wherein an exact controlled amount of prehardened but fluent ice cream may be deposited into individual packages from a continuous flow of ice cream in a novel and improved manner.

Another object of the invention is to provide a machine and method of this character wherein the amount of ice cream deposited shall be easily variable, for example, by the simple rotation of a single handwheel.

In one embodiment of the invention, two outlet or depositing nozzles are provided on the filling head, one for each of two rows of individual packages or sandwiches, and a further object of the invention is to provide a novel and improved method and means including said filling head for regulating the division of ice cream as it flows from the source or freezer into the two nozzles, thereby to compensate for the motion of the stream of ice cream and the varying pressures in the cross-section of a column of ice cream in motion, so as to ensure an equal amount of flow through each nozzle.

Still another object of the invention is to provide a novel and improved means for separating the stream of ice cream at the very tip of the depositing nozzle when the latter reaches the top of each package so that no ice cream is carried over the top of one package to the next package.

Other objects, advantages and results of the invention will be brought out by the following description in conjunction with the accompanying drawings in which FIGURE 1 is a perspective view of a machine embodying the invention;

FIGURE 2 is a fragmentary front elevation of the machine with portions broken away and shown in section for clearness in illustration;

FIGURE 3 is a fragmentary horizontal sectional view approximately on the plane of the line 3—3 of FIGURE 2;

FIGURE 4 is an enlarged fragmentary transverse vertical sectional view approximately on the plane of the line 4—4 of FIGURE 2 with portions shown in side elevation;

FIGURE 5 is a vertical longitudinal sectional view approximately on the plane of the line 5—5 of FIGURE 4 and showing also a row of packages, the packages having a filling relation to the depositing nozzles;

FIGURE 6 is a horizontal sectional view on the plane of the line 6—6 of FIGURE 5 with portions omitted and with the inlet nipple of the filling head shown schematically by a dot and dash line;

FIGURE 7 is a front elevation of the cam for reciprocating the filling head;

FIGURE 8 is a similar view of the cam for actuating the valve that controls the flow of ice cream from the filling head through the depositing nozzles;

FIGURE 9 is a perspective view of two rows of individual packages, some of which are shown as filled with ice cream and some of which are shown empty, in a carton;

FIGURE 10 is an enlarged detached perspective view of one of the packages showing a filled ice cream sandwich therein;

FIGURE 11 is a schematic illustration of the two depositing nozzles and two rows of packages with the nozzles in normal elevated position above the packages;

FIGURE 12 is a similar view showing the nozzles inserted into the packages;

FIGURE 13 is a view like FIGURE 12 but showing the elevation of the nozzles out of the packages and the depositing of the ice cream into the packages through the nozzles;

FIGURE 14 shows the packages after the pre-determined quantities of ice cream have been deposited therein and severed from the ice cream stream; and FIGURE 15 shows the closed and completed packages.

As hereinbefore indicated, the invention is especially designed for depositing ice cream between wafers that are prepackaged in bags so as to make ice cream sandwiches. Such sandwiches are shown in FIGURES 9 and 10 and each includes a wax paper bag A having therein two spaced apart wafers B that are held in spaced relation to each other by heavy paper former inserts C, although the specific form of the package or cavity into which the ice cream is to be deposited is relatively immaterial to the invention. Where such ice cream sandwiches are involved, the two wafers for each package and one of the former inserts are inserted into each bag to provide cavities between the wafers to receive the ice cream. The packages are shown as arranged in two rows each disposed in side-by-side relation to each other in a carton D which during the operation of depositing the ice cream, has its cover flaps D' unfolded into position to expose the cavities between the wafers, as shown in FIGURES 9 and 6.

The boxes are automatically fed with an intermittent motion, as by a conveyor generally designated E, to present the cavities of each row in succession beneath one of two depositing nozzles 1 and 2 of a filling head F through which the ice cream is forced under pressure through a tube 3 from a source of supply such as a freezer G (FIGURE 5), the flow of ice cream from which is manually controlled by a suitable valve 4.

Manifestly the conveyor E and the filling head are mounted on a frame or table H in which are two track rails 5 and 6 for the boxes D and upwardly between which project flights 7 connected in spaced relation to each other to an endless chain 8 of the conveyor E, which passes over sprockets 9 and 10 that are journalled on the frame as best shown in FIGURES 2 and 3. The flights are spaced apart distances to receive between them the boxes D as best shown in FIGURES 1 and 5 and the conveyor is driven intermittently in steps each of a length to move one filled cavity away from the corresponding depositing nozzle and simultaneously move the next following empty cavity into filling position beneath the depositing nozzle. For this purpose there has been shown an electric motor I mounted on the frame H and having a standard adjustable drive pulley 11 on its shaft that is connected by a belt 12 to another standard adjustable pulley 13 which is mounted on the input shaft 14 of a speed reducing gear 15 that is also mounted on the frame and has an output shaft 16 projecting from opposite ends thereof and on one end of which is mounted a crank 17 which is connected by a link 18 pivotally connected through a rocking pivot pin 19' to a pawl-actuating lever 19 which is pivotally mounted on the shaft 20 of the sprocket 10. The pawl-actuating lever has a pawl 21 pivotally mounted thereon and normally biased by a spring 22 into engagement with a ratchet 23 which is fast connected to the shaft 20 and with which also coacts a back-stop pawl 24 pivotally mounted on the frame and biased into engagement with the pawl by the spring 25.

The important feature of the invention is the method and filing head assembly and the actuating means therefor for depositing the ice cream into the cavities which, as above stated, are shown as constituting the spaces between the wafers B of ice cream sandwiches. As shown, the filling head includes a body 26 within which is a cylindrical pressure chamber 27 having a bottom wall 28 and a top wall 29 that is preferably separably connected to the body in fluid-tight relation thereto in any suitable manner. The top wall has an inlet nipple 29' to which is connected the tube 3, while the bottom wall has two discharge openings 30, one for each of the depositing nozzles 1 and 2; and the flow of ice cream from the pressure chamber through the nozzles is controlled by a rotary valve 31 having transverse passages 32 therethrough each to register in one position of the valve with one of the discharge passages 30 and the corresponding nozzle as best shown in FIGURES 4 and 5.

In accordance with the invention, the body 26 is reciprocated vertically to move the depositing nozzles into and out of the cavities; and while the nozzles are in the cavities the valve is open to permit the flow of the ice cream into the cavities and during upward movement of the nozzles above the cavities, the valve is closed. For accomplishing this purpose, the filling head assembly has been shown mounted on a slide 33 which is vertically reciprocable on upstanding guide rods or posts 34 which pass through the top plate H' of the table or frame H and have their lower ends rigidly secured to the frame as indicated at 34' as best shown in FIGURES 1 and 4. The actuating means for the slide comprises a lever 35 pivotally mounted at one end on a horizontal pivot pin 36 which is secured in a bearing bracket 37 which depends from the underside of the top plate H', and has one end pivotally connected at 38 to a reciprocating drive rod 39 mounted in bearings 40 secured to the top plate H'. Intermediate its ends the lever 35 has a follower roller 41 which follows a box cam groove 42 in one face of a cam disc 43 which is fixedly connected to the output shaft of the speed reducing gear 15 one end of which is journalled in a bearing bracket 44 that depends from the top plate H' of the frame. The other end of the drive rod 39 is rigidly secured in a socket 45 at the bottom of the slide 33.

To facilitate the location of the actuating means for the valve 31, the filling head body 26 is secured to a bracket strap 46 whose opposite ends are secured to the slide by cap screws 47 and whose intermediate portion is spaced from the slide. The actuating means for the valve includes a vertically reciprocable drive rod 50 that is mounted in the bearings 40 and has its lower end pivotally connected at 51 to one end of a lever 52 the other end of which is pivotally mounted on a pivot pin 53 in the bearing bracket 37. Intermediate its ends, the lever 52 has a follower roller 54 which follows a box cam groove 55 in the side of the cam disc 43 opposite the groove 42, as shown in FIGURE 8. The upper end of the drive rod 50 is pivotally connected at 56 to one end of an adjustable link 57 comprising two screw threaded connected sections the other end of which is connected to a pivot stud 58 projecting from a block 59 slidable in an undercut groove 60' in an arm 60 which is rigidly connected to a pivot rod 61 that is journalled in and passes through the head 33 and has its other end rigidly connected to one end of another arm 63 the other end of which is pivotally connected at 64' to a link 64 which is in turn pivotally connected to a crank pin 65 on the end of the rotating valve body 31. The pivot block 59 is adjustable in the groove of the arm 60 and is held in adjusted position by a nut 66 on the stud 58 the tightening of which clamps the block against movement in the groove. This adjustment and the adjustability of the two sections of the link 57 provide for adjustment of the extent of throw or rotation of the valve and the positioning of the valve passages 32 with respect to the outlet openings 30 of the filling head, respectively.

Now explaining the operation of the machine so far described, initially the filling head will be in its uppermost position as shown in all the figures and the valve 31 will be closed. When the cavities are to be filled in the ice cream sandwiches as above described, the cartons of the packages will be placed on the track rails 5 and 6 with the conveyor flights 7 between them as shown for example in FIGURE 6, and one of the cavities to be filled will be positioned beneath each of the depositing nozzles 1 and 2. Upon starting of the motor I, the slide 33 with the filling head assembly thereon is moved by the lever 35 rapidly downwardly so that the bottom edges of the nozzles enter the respective cavities to a point about three quarters of an inch from the bottoms of the cavities as shown in FIGURE 12 and by broken lines in FIGURE 5. At this point, the valve is rotated by the lever 52, drive rod 50, links 57, arms 60, 63 and link 64 to open the valve and permit ice cream to start flowing into the cavities, it being understood that prior to the starting of the machine, the flow of the ice cream from the freezer will have been started by opening of the valve 4 so as to fill the chamber 27 of the filling head body, and at the same time trapping and compressing air in the chamber above the ice cream. The cavity is rectangular in shape with somewhat square corners, and the nozzles are similarly shaped but smaller and are momentarily held in this lower position so that the pressure of the ice cream J causes the lower corners of the cavities to be filled. It will of course be understood by those skilled in the art that the disc will be rotated at the proper speed and the cam grooves will be properly shaped to effect this operation.

Then the entire slide and filling head assembly, the valve still open, are elevated at a uniform rate so that the lower edges of the nozzles are always above the deposited ice cream, as shown in FIGURE 13, allowing, however, sufficient time for the cavities to fill without any voids. This rise takes place to a point where the bottoms of the nozzles are about five eighths of an inch below the tops of the cavities, and at this point the closing of the valve is started. The entire assembly continues to rise at the same uniform rate until the bottoms of the nozzles reach the tops of the cavities. By this time, the valve is entirely closed and when the bottoms of the nozzles reach the tops of the cavities, the upward movement of the nozzles is slowed down long enough for the ice cream, which has been trapped in each nozzle as a result of the valve closing, to expand into the cavities so that any remaining ice cream in the nozzles is not under any pressure.

At this point, the entire filling head assembly is rapidly elevated to a point about one inch above the tops of the cavities, and the abruptness of this rapid rise causes a sharp break or separation between the ice cream in the cavities and the ice cream remaining in the depositing nozzles as shown in FIGURE 14.

As soon as the filling assembly reaches its uppermost position, the conveyor chain 8 is actuated by the pawl and ratchet mechanism 17–25 to cause the flights or push fingers 7 to move and index the boxes so that the next pair of cavities are presented beneath the depositing nozzles and the hereinbefore described cycle is repeated.

Thereafter the flaps D' of the carton are folded inwardly over the cavities and deposited ice cream and are sealed together as shown in FIGURE 15, whereupon the carton with its contents is ready for storage or shipment.

It is desirable that the speed of operation of the parts be varied from time to time, depending upon the condition of the ice cream, the capacity of the cavities, etc., and the invention contemplates a simple means for doing this. As shown, each of the pulleys 11 and 13 is of known standard construction and includes two sections one of which is movable relatively to the other to vary the depth of the V-groove between the two sections and thus vary the ratio of the driving and driven pulleys. As shown, the movable sections of the pulleys 11 and 13 are pivotally connected at 67 and 68, respectively, to a control lever 69 which is pivotally mounted intermediate its ends at 70 on the frame, and one end of the lever is pivotally connected at 71 to a slide block 72 that is mounted in guides 73 on the frame. An adjustment shaft 74 has one end swivel-connected to the block 72 and has its other end portion screw threaded at 75 and coacting with a nut 76 rigidly connected to the frame. The outer end of the adjustment shaft has a handwheel 77 attached thereto for conveniently rotating the shaft; and obviously upon rotation of the shaft in either direction, the lever 69 will be actuated to adjust the pulley sections and thus vary the speed of the input shaft 14 of the speed reducing gear, and in this way vary the speed of the rotation of the cam disc and the pawl and ratchet mechanism 17-25.

Another important feature of the invention is the means for regulating the division of the ice cream from the inlet nipple 29' as the ice cream enters the accumulating chamber 27 of the filling head, into two or more portions so that the flow of the ice cream from the two nozzles shall be equal. It will be understood by those skilled in the art that the discharge openings of the nozzles preferably conform in shape to the cross-section of the cavities and that the size of the nozzle discharge openings will be made such that the rate of flow of the ice cream through the nozzles and the resulting back pressure to the ice cream freezer are properly balanced. While the discharge valve 31 is closed, the pressure of the air in the accumulating chamber above the ice cream acts as a buffer to the pressure of the incoming ice cream. When the discharge valve 31 opens with the nozzle near the bottom of the mold, the built-up pressure in the chamber forces the ice cream into the corners of the cavity as shown schematically in FIGURES 12 and 13. The air pressure above the ice cream also compensates for or tends to reduce any surging in the flow of ice cream from the freezer. For the purpose of dividing the stream of ice cream as it enters the accumulating chamber from the freezer, a divider plate 78 is mounted to rotate in the accumulating chamber on an axis coincident with the axis of the chamber so that it can extend across the opening of the nipple 29' and divide the inflowing stream of ice cream as shown best in FIGURE 6. As shown, the nipple 29' is disposed at one side of said axis and between said discharge openings, and the divider plate 78 has a coaxial pivot stud 79 at the upper end thereof which is journalled in an opening in the top plate 29 of the filling head body; and an operating handle 80 is rigidly connected to said stud so that by swinging the handle 80, the divider plate can be easily rotated into different positions as shown by the solid and the broken lines in FIGURE 6. The handle is connected to the stud so that it lies in the same plane as the divider plate and thereby serves as an indicator of the position of the divider plate. A fluid-tight joint is provided between the stud 79 and the top plate by a Neoprene packing ring 81 interposed between a shoulder on the stud and the bottom of a counterbore 82 in the top plate, the stud having a nut 83 at its outer end for clamping the packing between the shoulder on the stud and the bottom of the counterbore 82 in the top plate. The edges of the divider plate are slightly spaced from the inner wall of the accumulating chamber, providing for a limited leakage of the ice cream from one side of the plate to the other. With this construction it will be understood that the divider plate 78 may be adjusted according to the conditions of operation so as to produce the desired flow of ice cream through the two nozzles, the divider overcoming the inherent motion of the flow of ice cream as well as the varying pressures in the cross-section of the column of ice cream that result, for example, from the consistency and degree of hardness of various portions of the stream.

While the now preferred embodiment of the invention has been shown and described, it should be understood that this is primarily for the purpose of illustrating the principles of the invention and that the structural details of the machine and the steps of the method may be modified within the spirit and scope of the invention. It will be observed that the packages comprising a paper bag and the spaced apart wafers constitute molds, and that the machine of the invention with appropriate modifications can be utilized for filling molds of other types or depositing predetermined amounts of fluent material for any purpose.

I claim:

1. In a depositing machine for fluent substances, in combination with a frame and a support thereon for molds each having a cavity, a filling head having an accumulating chamber therein provided with an inlet nipple at the upper end thereof and outlets at the lower end thereof and a nozzle in register with each outlet, means for continuously supplying a fluent substance to said accumulating chamber through said inlet, and valves controlling the flow of a fluent substance from said chamber through said nozzles, means on said frame mounting and reciprocating said filling head vertically to move said nozzles into and out of said mold cavities, and means on said frame for successively holding said valves in closed position during the descent of said filling head nozzles into said cavities, opening the valves and holding them open while the nozzles are in and rising out of said mold cavities, and closing the valves at a point below the top of the mold cavities during elevation of the nozzles out of the mold cavities, said chamber being cylindrical, said inlet nipple being disposed at one side of the axis of said chamber, and a divider plate in said accumulating chamber rotatable about an axis that is coincident with the axis of the accumulating chamber to divide the inflowing stream of fluent substance into a plurality of portions, one for each nozzle, and means exterior of the filling head for rotating said divider plate.

2. In a depositing machine for fluent substances, in combination with a frame and a support thereon for a mold having a cavity, a filling head having an accumulating chamber therein provided with an inlet at the upper end thereof and an outlet at the lower end thereof and a nozzle in register with said outlet, means for continuously supplying a fluent substance to said accumulating chamber through said inlet, and a valve controlling the flow of a fluent substance from said chamber through said nozzle, means on said frame mounting and reciprocating said filling head vertically to move said nozzle into and out of said mold cavity, and means on said frame for successively holding said valve in closed position during the descent of said filling head nozzle into said cavity, opening the valve and holding it open while the nozzle is in and rising out of said mold cavity, and closing the valve at a point below the top of the mold cavity during elevation of the nozzle out of the mold cavity, means for conveying the mold to a position beneath the nozzle, momentarily holding the mold in said position and thereafter moving the mold from beneath the nozzle, in timed relation to the reciprocation of the filling head, the last-named means including stationary guide rails on the frame for the mold, an endless conveyor chain having flights thereon to engage the mold, a pawl and ratchet mechanism and a motor driving it for actuating said conveyor chain step by step, and said means for reciprocating said filling head including a cam driven by said motor, a follower lever pivoted on said frame for said cam connected to said filling head, and said means for actuating the valve comprising a cam coaxial with the first-mentioned cam, a follower lever pivoted on said frame for said second-mentioned cam and a connection between said follower lever and said valve.

3. In a depositing machine as defined in claim 2 wherein said filling head is mounted on a slide, said valve is rotatable and has a crank pin at one end thereof, and said means for actuating the valve includes a reciprocating drive rod mounted in fixed bearings on said frame and connected to said second-mentioned follower lever, a lever pivotally mounted intermediate its ends on said slide, a link pivotally connecting one end of said lever to said drive rod, and another link pivotally connecting the other end of said lever to said crank pin of the valve.

4. In a depositing machine for fluent substances, in combination with a frame and a support thereon for a mold having a cavity with side and bottom walls angularly related to each other, a filling head having an accumulating chamber therein that has an inlet at the upper end thereof and an outlet at the lower end thereof and a nozzle in register with said outlet, a valve between said chamber and said nozzle controlling the flow of a fluent substance from said outlet through said nozzle, means for continuously supplying a fluent substance to said accumulating chamber through said inlet under pressure and at the same time entrapping and compressing a quantity of air in said chamber above the fluent substance, means on said frame mounting and reciprocating said filling head vertically to move said nozzle into and out of said mold cavity, and means on said frame for successively holding said valve in closed position during the descent of said filling head nozzle into said cavity, opening the valve and holding it open while the nozzle is in and rising out of said mold cavity providing for expansion of said air in the chamber and forcing of the fluent substance into the angles between the walls of the mold cavity and closing the valve at a point below the top of the mold cavity during upward movement of the nozzle out of the mold cavity to relieve the pressure of the substance in the nozzle, said means for reciprocating the filling head providing after closing of the valve movement of the filling head at a predetermined rate while the nozzle is in said cavity and thereafter momentary acceleration of the upward movement when the discharge end of the nozzle reaches a point close to the top of the mold cavity.

References Cited by the Examiner
UNITED STATES PATENTS

| 2,208,028 | 7/40 | Harrington | 141—263 |
| 2,521,403 | 9/50 | Overland | 107—54.4 X |
| 2,672,262 | 3/54 | Gross et al. | 141—263 X |
| 2,708,055 | 5/55 | Alexander | 107—27 |
| 2,925,102 | 2/60 | Cummings et al. | 141—263 |
| 2,934,872 | 5/60 | Wise | 99—180 X |

ROBERT E. PULFREY, *Primary Examiner.*

J. D. SEERS, CHARLES A. WILLMUTH, WILLIAM B. PENN, *Examiners.*